Oct. 1, 1963     O. DE MURREL CRUMP     3,105,341
WINDROW ATTACHMENT FOR ROTARY MOWERS
Filed May 12, 1961
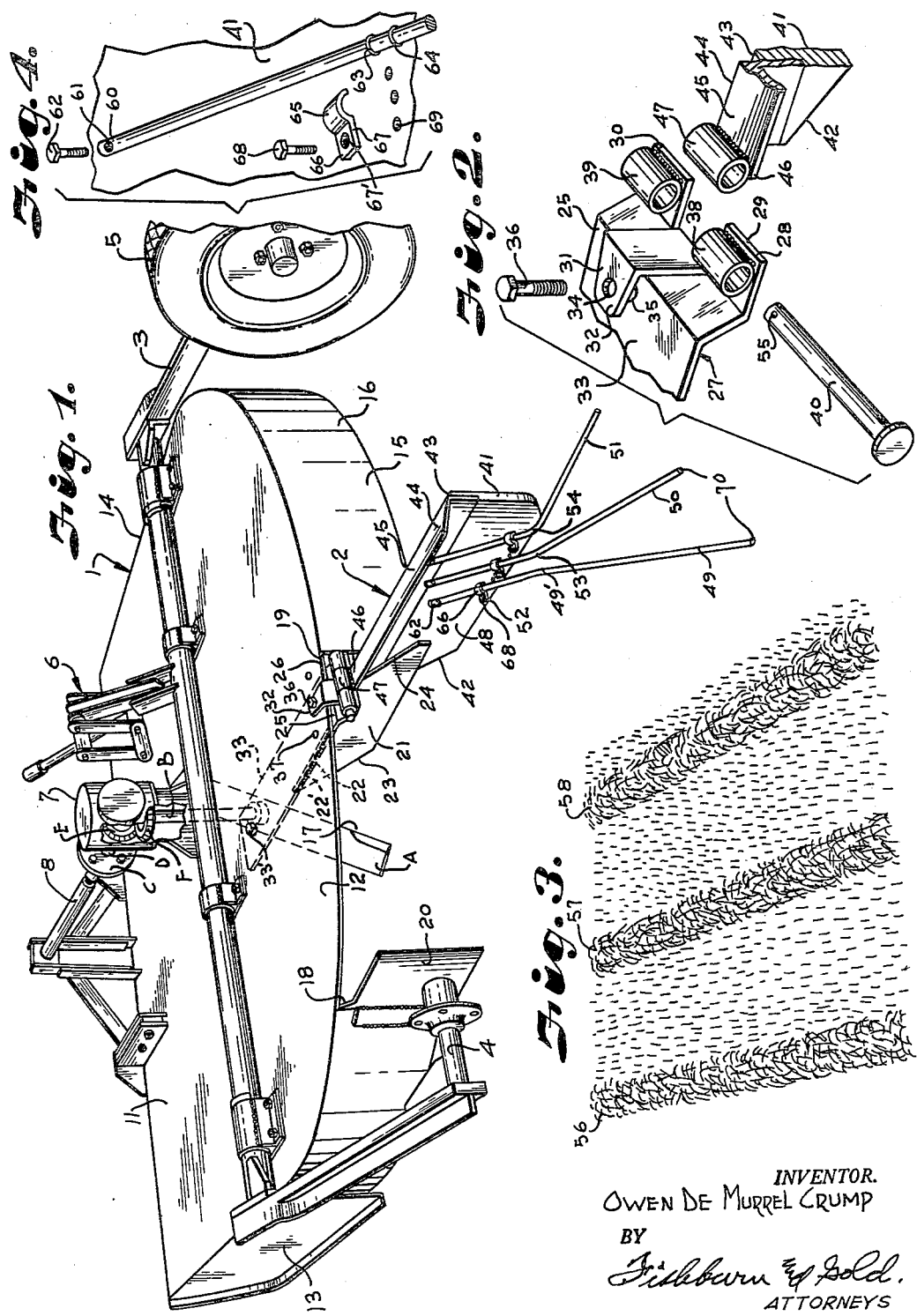
INVENTOR.
OWEN DE MURREL CRUMP
BY
ATTORNEYS United States Patent Office 3,105,341
Patented Oct. 1, 1963

3,105,341
WINDROW ATTACHMENT FOR ROTARY MOWERS
Owen De Murrel Crump, 501–11 S. Kansas Ave.,
Olathe, Kans.
Filed May 12, 1961, Ser. No. 109,582
1 Claim. (Cl. 56—192)

This invention relates to rotary mowers, and more particularly to an attachment for windrowing and turning the cut material such as grass and the like as it is discharged from the housing of the mower.

Ordinarily, in use of high speed rotary mowers having a housing with depending sides, there is at times an opening in one side thereof for delivery of cut material therefrom with a baffle plate in the skirt of the shield. In such case, the material is spread over the ground in an uneven manner and in a way to form a mulch thereover. Quite frequently, it is desirable to pick up the cut grass and other material from the mower and when it is spread over in a mulch arrangement it is difficult to pick up such material, and it is often spread in clumps which prevent even drying of the cut material. When grass is cut by a mower such as a sickle bar type, it is necessary to crimp the hay with a second machine and then use a rake commonly known as "side delivery" or "sweep" rake to windrow the cut grass or hay so that it may be picked up by a loader or baling press or other implement.

A conventional type rotary mower with a high speed blade can be made to windrow to some extent with a baffle plate, but the force ejects the hay firmly to the ground, leaving a considerable portion flat against the ground so that the hay cannot be dried and cured properly within a reasonable period of time without moving it with some sort of a windrow turner. It is of the utmost importance in making hay to reduce the length of time from the cutting of the hay to the actual baling and storing, and thus reduce the possibility of rain on the hay after it is cut which reduces the value thereof and in some instances will totally destroy it.

In more recent years, it has become the custom to pick up the grass or hay from a mower by a baling device to bale the hay for easier handling and storing. So far as applicant is aware, no one has devised a successful combination windrow and windrow turner attachment for a rotary mower.

It is, therefore, the principal object of the present invention to provide a windrow attachment for a rotary mower having a housing provided with a depending skirt in which there is an opening in the rear of the depending skirt and the windrow attachment is pivotally mounted at one side of said opening whereby the cut grass discharged through said opening will be rolled by said attachment into a neat windrow where it may be picked up by another implement, such as a baler.

Other objects of the present invention are to provide a mobile frame having a housing with depending skirts on the sides and rear thereof adapted to be propelled from a tractor or the like and the rotary blade driven through a gear arrangement and shaft from the power take-off of said tractor.

Still further objects of the present invention are to provide an opening through which the grass or hay is discharged by the rotary blade from said housing rearwardly of the housing; to provide a baffle plate on one side of the depending skirt adjacent the discharge opening; to provide a baffle plate in said opening spaced from the other side thereof; to provide means for securing said last plate to the housing whereby the grass will be discharged between said last named baffle plate and the other edge of said depending skirt in said opening; to provide means for adjusting the bracket laterally with respect to the second baffle plate; to provide an elongated board or blade rotatably mounted on said bracket and adapted to trail said mower and resting on the terrain or ground over which the mower travels so as to move vertically with respect to said ground; to provide said board with a plurality of rods in spaced relation on said board so that the lower one will be near the ground and the other will be spaced upwardly therefrom; to provide means for mounting the rods on the board for adjustment thereof to accommodate heavy or light hay or grass; to provide said rods with an angle away from said board and laterally toward the opposite side of said opening whereby the grass delivered from said opening will be contacted by said board and said rods to roll the same laterally to a windrow position; to provide means for pivotally mounting the board on the bracket so that it rotates in a plane containing the axis of the cutting blade; to provide gear means for reducing the speed of rotation of the cutter blade to cut and crimp the hay and shred it to facilitate drying thereof; and to provide a device for this character simple and economical to manufacture.

Other objects and advantages of this invention will become apparent from the following description taken in connection with the accompanying drawings wherein are set forth by way of illustration and example certain embodiments of this invention.

FIG. 1 is a perspective view with parts broken away showing a rotary mower and my windrow attachment thereon.

FIG. 2 is a disassembled view particularly illustrating the bracket mounting of the windrowing board.

FIG. 3 is a perspective view of the cut grass after windrowing with my attachment.

FIG. 4 is a disassembled view showing the attachment of the rods on the windrow board.

Referring more in detail to the drawings:

1 designates a mower of rotary type to which my windrowing attachment 2 may be secured. The mower includes a frame 3 having axles 4 for mounting of wheels 5 and mechanism 6 for raising and lowering the frame to adjust the height of the cutter blade A. The mower includes the usual vertical shaft B upon which the blade is mounted and a housing 7 for gears for driving the shaft and a drive shaft 8 attached to the power take-off (not shown) of a tractor.

A slip clutch C is connected to the shaft 8 and a small shaft D is connected to the clutch and has one end provided with a flat gear E in the gear box box meshing with a larger gear F on the larger vertical shaft B upon which the blade A is mounted. The gear arrangement is adapted to slow down the tip speed of the blade in order to crimp the grass or hay after it is cut to facilitate quicker drying thereof.

The mower includes a housing or cowling 11 having a top 12 and depending sides 13 and 14 and depending rear skirt portion 15. The rear portion of the housing is rounded as indicated at 16.

A depending skirt 15 has a cut-out or notched portion 17 having side edges 18 and 19. I have here illustrated the cut-out portion 17 to be to the left side of the longitudinal center of the housing and spaced from the side 13 so that the opening will be slightly inwardly from the wheel on the axle 4, the wheel being left off to illustrate the opening and other parts.

Rigidly secured to the side edge 18 of the opening 17 is a baffle plate 20 extending rearwardly from said opening. A second baffle plate 21 is rigidly secured under the top 12 of the housing by welding or other suitable means, as indicated at 22, to the side edge 22' of a leg 33 of the bracket 25 so that the baffle will move with the bracket when adjusting the windrow board 41, as later shown.

The second baffle plate 21 is tapered rearwardly, as indicated at 24, on its rear edge and also tapered upwardly on its front edge, as indicated at 23, so as to avoid contact with the cutting blade. The baffle plate 21 is spaced from the ground slightly more than the baffle plate 20.

A bracket 25 is provided for mounting on the rear 26 of the top 12 of the housing and comprises an angle-shaped plate 27 with the leg 28 thereof extending laterally forming bifurcated arms 29 and 30. The bracket includes an L-shaped upstanding arm 31 rigidly connected to the arms 29 and 30 and has the horizontal arm portion 32 thereof extending over and spaced from the leg 33 of the angle-shaped member 27. The leg 33 of the bracket is elongated and extends forwardly under the top 12, as shown in FIG. 1, and is pivotally secured to the housing by a bolt or the like 33'. The leg 33 and horizontal portion 32 are provided with aligned openings 34 and 35 for receiving a bolt 36 which engages through one of a plurality of spaced openings 37 in the rear edge of the top 12 of the housing 11, as illustrated in FIG. 1.

Mounted on the rearwardly extending spaced arms 29 and 30 by welding or other suitable means, are sleeve members 38 and 39 for receiving a pin 40 for attachment thereto of a board or plate 41 which forms the windrow mechanism.

The board 41 is elongated and substantially rectangular in shape and has its forward edge tapered upwardly from the bottom, as indicated at 42. Rigidly secured to the upper edge 43 of the board by welding or other suitable means, is an angle-shaped member 44 having a horizontal flange portion 45. Mounted on the forward end 46 thereof by welding or other suitable means, is a sleeve bearing member 47 through which the pin 40 extends to pivotally mount the board 41 on the bracket 27.

Adjustably secured to the side 48 of the board 41 toward the rear end thereof, are spaced rods or fingers 49, 50 and 51. The ends of the rods which are adjustably secured to the board 41 extend at an angle upwardly from the lower edge of the board toward the front end thereof. The rod 49 is bent upwardly and laterally, as indicated at 49', so that it extends substantially parallel with the bottom 52 of the board 41 and toward the baffle plate 20. The rod 50 is also bent, as indicated at 53, upwardly at a greater angle than the rod 49 and also laterally toward the baffle plate 20. The rod 51 is bent, as indicated at 54, at an angle upwardly and laterally toward the baffle plate 20 at a greater angle than the rod 50, as illustrated in FIG. 1.

The ends 60 of the rods are provided with openings 61 for receiving bolts or the like 62 to pivotally mount the rods to the board 41. Spaced from the ends 60 of the rods are spaced ribs 63 and 64, between which are adapted to engage the semi-circular portion 65 of brackets 66 having legs 67 provided with openings 67' for receiving bolts 68 for attachment of the brackets to the board 41. In order to adjust the rods vertically on the board, I provide a plurality of openings 69 in slightly curved relation to each other. To raise or lower the outer ends 70 of the rods, the bolts 68 may be removed and replaced in the desired opening to accomplish the raising or lowering. This may be necessary in cutting different type hay. In very heavy hay, such as alfalfa, it may be necessary to raise the rods. In some instances, it may be necessary to add additional rods.

The operation of a mower of the type here illustrated with the windrowing attachment thereon, is as follows:

When the mower is propelled forwardly by the tractor, the blade will be rotating in an anti-clockwise direction at a reduced speed, and the grass or other material cut by the blade is cracked and crimped and some shredded so that it will be carried by the blade to the discharge opening 17 and the grass will move between the baffle plates 20 and 21. The board 41 will engage the grass as it moves alongside the baffle plate 21, and the rods or fingers 49, 50 and 51 will engage the grass as it reaches that point and, by a rolling action, will move the grass laterally to windrow it in a line substantially even with the line of direction of the plate 20. The board 41 and baffle 21 may be adjusted laterally with respect to the edge 19 of the opening 17 as desired by disengaging the bolt 36 and inserting it in one or the other of the spaced openings 37 in the top of the housing. Adjustment of the board laterally may be necessary due to heavy or light grass or hay and depending upon the distance it is desired to move the grass laterally for drying ready to be picked up by another implement. In some instances, the grass may be heavy, and it will necessitate a wider spread of the windrow to facilitate drying and, in lighter grass, the windrow may be narrower and still obtain the proper drying.

It will be obvious that the board 41 is pivoted so that it may move vertically over rough terrain as in normal use it moves on top of the terrain through pivoting of the board on the bracket 27 and pin 40. The pin 40 has a transverse opening 55 for receiving a cotter pin or the like (not shown) to retain the same in place.

In FIG. 3, I have illustrated diagrammatically, spaced windows 56, 57 and 58 to show how the grass is moved or rolled into the windrow by each swath cut by the mower; for instance, the first swath will move the grass to the windrow 56, and the next swath will make the windrow 57, etc., so that by moving the baler or other implement along the windrows the grass or hay may be picked up for baling or other use.

It will be obvious from the foregoing that I have provided a new windrow attachment for rotary mowers wherein the grass or hay may be rolled to a desired tightness or density to facilitate drying thereof.

It is to be understood that while I have illustrated and described certain forms of my invention, it is not to be limited to the specific forms or arrangements of parts herein described and shown except insofar as such limitations are included in the claim.

What I claim and desire to secure by Letters Patent is:

In a rotary mower for cutting grass or the like having a blade driven for rotation within a housing having depending side skirts and a depending rear skirt, said depending rear skirt having an opening located between the longitudinal center of said housing and one side thereof, said opening forming side edges in said rear skirt, the edge of said opening in the skirt near the side of said housing having a baffle plate extending rearwardly and curved inwardly of said side edge, an attachment for windrowing said grass as it is discharged from said opening by rotation of said blade comprising, an elongated board, means adjustably attaching said board to said housing between said baffle plate and the side edge of said opening nearest the longitudinal center of said housing, said board trailing said mower and riding on the ground, said means including a hinge member to allow said board to pivot vertically with respect to said housing, and rearwardly spaced apart rods adjustably secured to said board and having respective rear portions bent rearwardly and laterally therefrom toward said baffle plate, said rods being adjustable one with respect to the other, said rear portions respectively being bent at progressively greater angles as the most rearward rod is approached whereby the grass discharged from said opening will be engaged by said board and said rods to roll the same laterally into a row.

References Cited in the file of this patent

UNITED STATES PATENTS

| | | |
|---|---|---|
| 2,495,032 | Stuhl | Jan. 17, 1950 |
| 2,747,354 | Bloser | May 29, 1956 |
| 2,756,556 | Watkins | July 31, 1956 |
| 2,770,937 | Huddle | Nov. 20, 1956 |
| 3,037,341 | Collins | June 5, 1962 |